(12) United States Patent
Inagaki et al.

(10) Patent No.: US 6,874,858 B2
(45) Date of Patent: Apr. 5, 2005

(54) AUTOMOTIVE ANTI-LOCK CONTROL SYSTEM

(75) Inventors: Hiromi Inagaki, Saitama (JP); Masaru Gotoh, Saitama (JP); Hidetoshi Kobori, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/742,103

(22) Filed: Dec. 19, 2003

(65) Prior Publication Data

US 2004/0135427 A1 Jul. 15, 2004

(30) Foreign Application Priority Data

Dec. 20, 2002 (JP) ........................................ 2002-370203

(51) Int. Cl.[7] .................................................. B60T 8/34
(52) U.S. Cl. ................................. 303/113.1; 303/116.2; 303/119.2; 303/20
(58) Field of Search ................................ 303/191, 155, 303/157, 113.1, 115.2, 119.1, 20, 116.2, 199, 119.2

(56) References Cited

U.S. PATENT DOCUMENTS

| 5,934,767 A | 8/1999 | Schmidt et al. |
| 6,017,017 A | 1/2000 | Lutz et al. |
| 6,592,192 B1 * | 7/2003 | Kaneda et al. ............... 303/156 |

FOREIGN PATENT DOCUMENTS

| DE | 199 30165 A1 | 1/2000 |
| EP | 0982207 * | 3/2000 |
| EP | 1234 492 A2 | 9/2002 |
| GB | 2 258 894 A | 2/1993 |
| JP | 5-50903 | 3/1993 |
| JP | 09039772 | 2/1997 |
| JP | 09-104335 | 4/1997 |
| JP | 09104335 | 4/1997 |
| JP | 2001-260840 * | 9/2001 |

* cited by examiner

Primary Examiner—Robert A. Siconolfi
Assistant Examiner—Bradley King
(74) Attorney, Agent, or Firm—Carrier, Blackman & Associates, P.C.; Joseph P. Carrier; William D. Blackman (57) ABSTRACT

An anti-lock controller controls an anti-lock brake system so as to realize any of a pressure decreasing mode where a normally-opened electromagnetic valve is closed, while a normally-closed electromagnetic valve is opened, a holding mode where the normally-opened electromagnetic valve is closed and the normally-closed electromagnetic valve is closed, and a pressure increasing mode where the normally-opened electromagnetic valve is opened, while the normally-closed electromagnetic valve is closed. Then, in the holding mode, for example, in the event that a predetermined condition is established where the voltage of a power supply for a vehicle or the terminal voltage of the normally-opened electromagnetic valve is equal to or smaller than a set value which is determined in advance, a current value that is applied to the normally-opened electromagnetic valve is controlled so as to become smaller than a current value that is applied to the normally-opened electromagnetic valve in the pressure decreasing mode.

3 Claims, 5 Drawing Sheets

| | STOP | PRESSURE INCREASING | | HOLDING | | PRESSURE DECREASING |
|---|---|---|---|---|---|---|
| | | PRESSURE INCREASING | DUTY PRESSURE INCREASING | DUTY HOLDING | HOLDING | |
| NORMALLY-OPENED ELECTROMAGNETIC VALUE | OFF | OFF | DUTY | DUTY | ON | ON |
| NORMALLY-CLOSED ELECTROMAGNETIC VALUE | OFF | OFF | OFF | OFF | OFF | ON |

| | STOP | PRESSURE INCREASING | | HOLDING | | PRESSURE DECREASING |
|---|---|---|---|---|---|---|
| | | PRESSURE INCREASING | DUTY PRESSURE INCREASING | DUTY HOLDING | HOLDING | |
| NORMALLY-OPENED ELECTROMAGNETIC VALUE | OFF | OFF | DUTY | DUTY | ON | ON |
| NORMALLY-CLOSED ELECTROMAGNETIC VALUE | OFF | OFF | OFF | OFF | OFF | ON |

ELAPSED TIME

AUTOMOTIVE ANTI-LOCK CONTROL SYSTEM

BACKGROUND OF THE INVENTION

1. Field of the Invention

The present invention relates to an automotive anti-lock control system.

2. Discussion of Background Art

Conventionally, as automotive anti-lock control systems, there is known in general an anti-lock control system comprising a normally-opened electromagnetic valve provided along a connection line which connects a master cylinder for generating a brake fluid pressure through the operation of a brake pedal and a wheel brake and a normally-closed electromagnetic valve along a release line which connects a reservoir for reserving brake fluid and the wheel brake, wherein, when a wheel is about to be locked up, the normally-opened electromagnetic valve is put in a closed condition, whereas the normally-closed electromagnetic valve is put in an opened condition so that a brake fluid pressure built up at the wheel brake is released to the reservoir via the release line (a pressure decreasing mode), in addition, when the brake fluid pressure at the wheel brake is attempted to be held, both the normally-opened electromagnetic valve and the normally-closed electromagnetic valve are put in closed conditions so that the wheel brake is cut off from the connection line and the release line (a holding mode), and furthermore, when the risk of wheel lockup has disappeared, the normally-opened electromagnetic valve is put in the opened condition, whereas the normally-closed electromagnetic valve is put in the closed condition so that a brake pressure built up at the master cylinder is transmitted directly to the wheel brake via the connection line (a pressure increasing mode), whereby, as required, the braking force is adjusted and controlled so that the slip rate of the wheel does not exceed largely a predetermined value through automatic control of so-called pumping operations by selecting the modes in an alternative fashion.

Then, in this type of automotive anti-lock control system, during the so-called holding mode where the brake pressure at the wheel brake is held as it is, in order to keep the normally-opened electromagnetic valve in the closed condition, a current value corresponding to 100% of the rated current value is applied continuously (for example, refer to Patent Literature No. 1).

[Patent Literature No. 1]
JP-A-9-104335 (page 14, FIGS. 15, 16)

In the above conventional automotive anti-lock control system, while the current value corresponding to 100% of the rated current value is applied continuously to the normally-opened electromagnetic valve in the holding mode, this rated current value is a value determined based on such demands that the automotive anti-lock control system should be able to function appropriately even if the battery voltage value of the vehicle decreases and that the normally-opened electromagnetic valve should be able to be held in the closed condition in an ensured manner even if a pedal depressing pressure applied to the brake pedal by the driver becomes maximum, and therefore, applying the current value corresponding to 100% of the rated current value to the normally-opened electromagnetic valve in a normal usage means that a current more than required or excessive current is applied to the same valve.

Due to this, there are pointed out problems that consumed current is increased and that the response to a changeover to the pressure increasing mode(requiring the normally-opened electromagnetic value to be changed over from the closed condition to the opened condition) which tends to be executed following the holding mode is degraded.

SUMMARY OF THE INVENTION

The invention is made in view of the situations and an object thereof is to provide an automotive anti-lock control system which can decrease consumed current and attempt to improve the response to the changeover from the holding mode to the pressure increasing mode.

With a view to solving the problems, according to a first aspect of the invention, there is provided an automotive anti-lock control system comprising a brake fluid pressure generator (for example, a master cylinder 2 in an embodiment), a wheel brake (for example, wheel cylinders 3a, 3b in the embodiment), a connection line (for example, a connection line 7 in the embodiment) for connecting the brake fluid pressure generator and the wheel brake, a release line (for example, a release line 10 in the embodiment) for connecting a reservoir (for example, a reservoir 9) for reserving brake fluid and the wheel brake, a normally-opened electromagnetic valve (for example, a normally-opened electromagnetic valve 8 in the embodiment) interposed along the connection line, a normally-closed electromagnetic valve (for example, a normally-closed electromagnetic valve 11 in the embodiment) interposed along the release line, a wheel speed sensor (for example, a wheel speed sensor 19 in the embodiment) for detecting the wheel speed of a wheel and an anti-lock controller (for example, steps s1 to 6 in the embodiment) which determines a lockup tendency of the wheel based on the wheel speed detected by the wheel speed sensor and controlling the brake fluid pressure of the wheel brake to a pressure decreasing mode where the normally-opened electromagnetic valve is closed whereas the normally-closed electromagnetic valve is opened, a holding mode where the normally-opened electromagnetic valve is closed and the normally-closed electromagnetic valve is closed, and a pressure increasing mode where the normally-opened electromagnetic valve is opened whereas the normally-closed electromagnetic valve is closed, wherein the anti-lock controller controls such that a current value applied to the normally-opened electromagnetic valve in the holding mode becomes smaller than a current value applied to the normally-opened electromagnetic valve in the pressure decreasing mode in a state in which a predetermined condition is established.

In the invention, when compared with the current value (a current value corresponding to 100% of the rated current value which brings the normally-opened electromagnetic valve into the closed condition) applied to the normally-opened electromagnetic valve in the pressure decreasing mode, when the current is applied to the normally-opened electromagnetic valve in the holding mode, consumed current is decreased, and the response to the changeover from the holding mode to the pressure increasing mode is improved by such an extent that the normally-opened electromagnetic valve is not opened with excessive energizing force in the holding mode.

According to a second aspect of the invention, there is provided an automotive anti-lock control system as set forth in the first aspect of the invention, wherein as the predetermined condition, a condition is adopted in which the voltage of a power supply for a vehicle or the terminal voltage of the normally-opened electromagnetic valve is equal to or larger than a set value which is determined in advance.

In the event that the voltage of the power supply for the vehicle is equal to or larger than the predetermined value that is determined in advance, or in the event that the terminal voltage of the normally-opened electromagnetic valve is equal to or larger than the predetermined value that is determined in advance, applying the current value corresponding to 100% of the rated current to the normally-opened electromagnetic valve means that excessive current which is equal to or larger than a current value required to bring the normally-opened electromagnetic valve into the closed condition is applied to the normally-opened electromagnetic valve. In the invention, in consideration of those events, the predetermined condition as set forth in the first aspect of the invention is such that the voltage of the power supply for the vehicle or the terminal voltage of the normally-opened electromagnetic valve is equal to or larger than the set value which is determined in advance, whereby the normally-opened electromagnetic value is brought into the closed condition without applying excessive current value thereto by causing the current value which is smaller than the rated current value to be applied to the normally-opened electromagnetic valve in the holding mode.

According to a third aspect of the invention, there is provided an automotive anti-lock control system as set forth in the first aspect of the invention, wherein as the predetermined condition, a condition is adopted where a brake fluid pressure which is being generated in the brake fluid generator is equal to or lower than a set pressure which is determined in advance.

When the brake fluid pressure that is being generated in the brake fluid generator is applied to the normally-opened electromagnetic valve, the pressure is applied in a direction in which the normally-opened electromagnetic valve is opened.

Due to this, in the event that the brake fluid pressure is low, when compared with a case where a high brake fluid pressure is applied, only a small force is required to close the normally-opened electromagnetic valve. In the invention, in consideration of this, the predetermined condition as set forth in the first aspect of the invention is such that the brake fluid pressure is smaller than the set pressure which is determined in advance, whereby the normally-opened electromagnetic valve is brought into the closed condition by causing the current value that is smaller than the rated current value to be applied to the normally-opened electromagnetic valve in the holding mode.

DETAILED DESCRIPTION OF THE PREFERED EMBODIMENTS

Referring to the accompanying drawings, an embodiment of an automotive anti-lock control system according to the invention will be described below.

Figure 1:
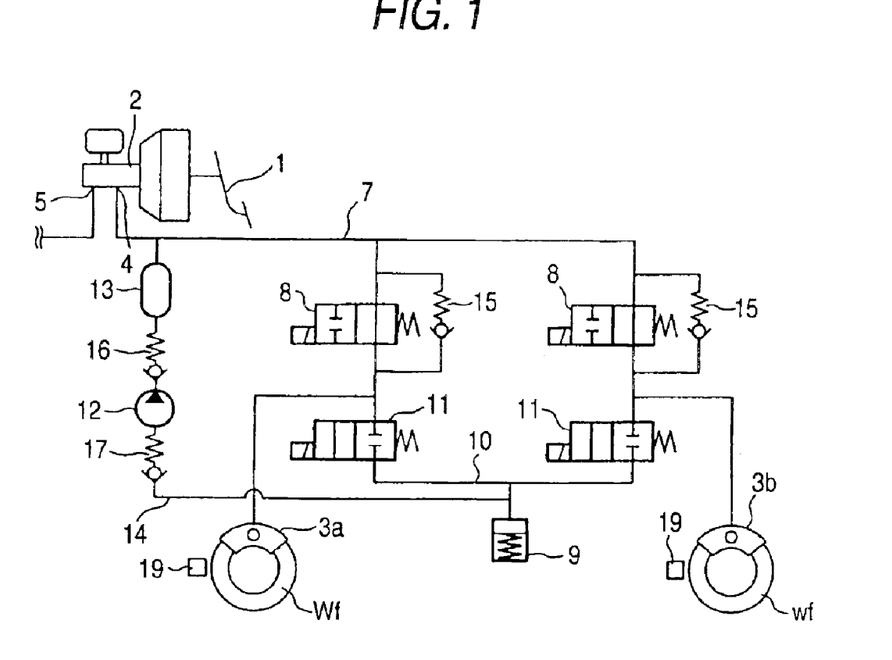
FIG. 1 is a schematic view illustrating the construction of an automotive brake system.
Figure 2A:
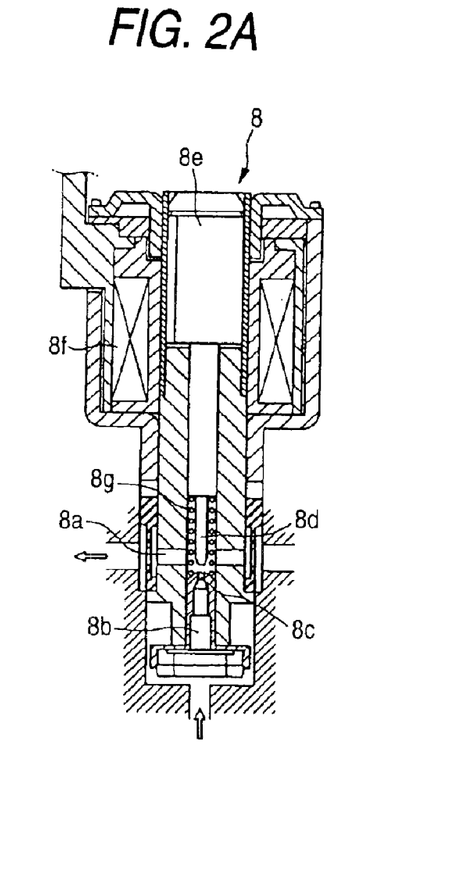
FIGS. 2A and 2B are cross-sectional views illustrating a normally-opened electromagnetic valve and a normally-closed electromagnetic valve, respectively.
Figure 2B:
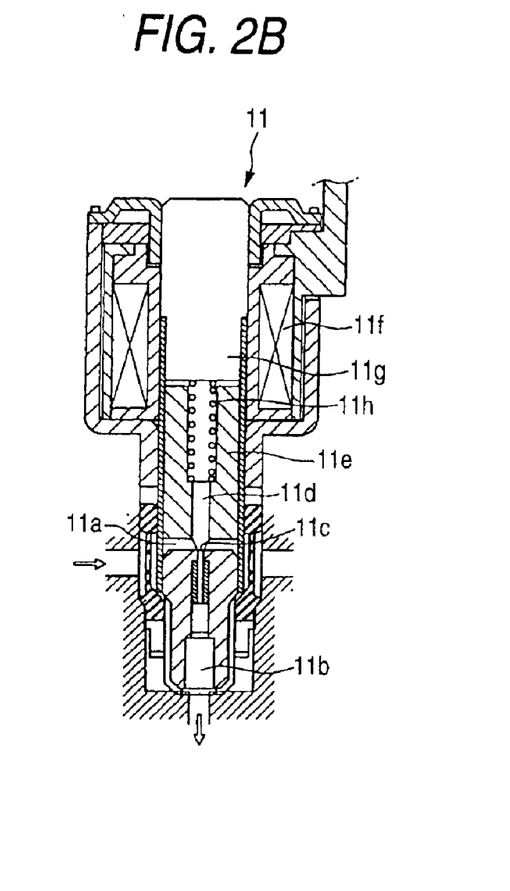
Figure 3:
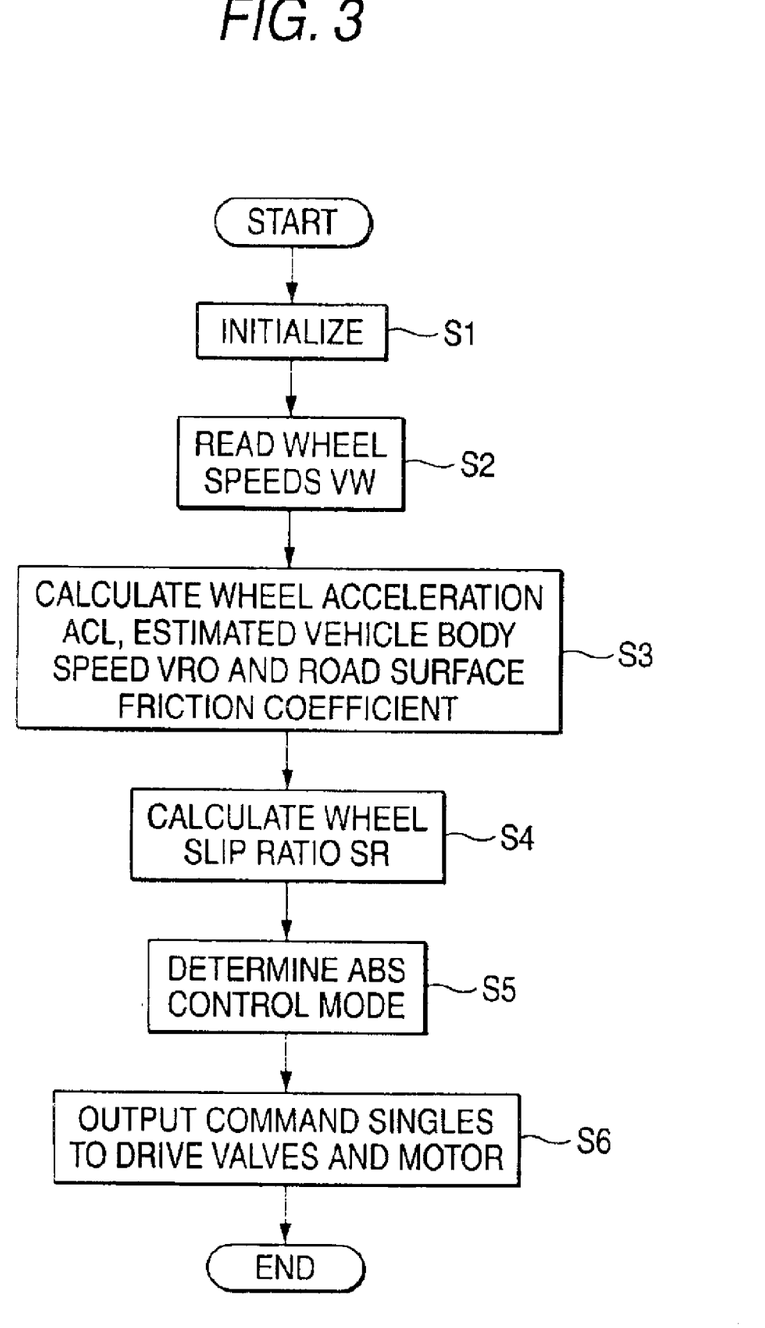
FIG. 3 is a flowchart illustrating the contents of an anti-lock controller according to the invention.
Figure 4:
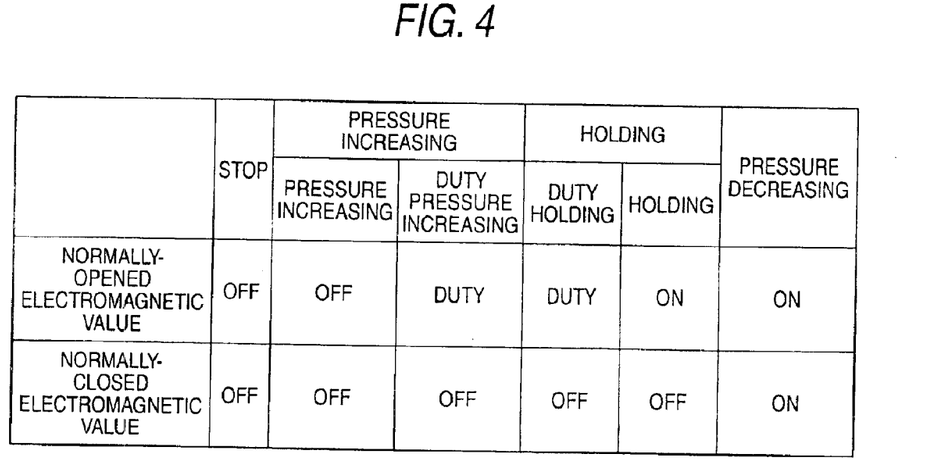
FIG. 4 is a diagram illustrating how the normally-opened electromagnetic valve and the normally-closed electromagnetic valve are controlled.
Figure 5:
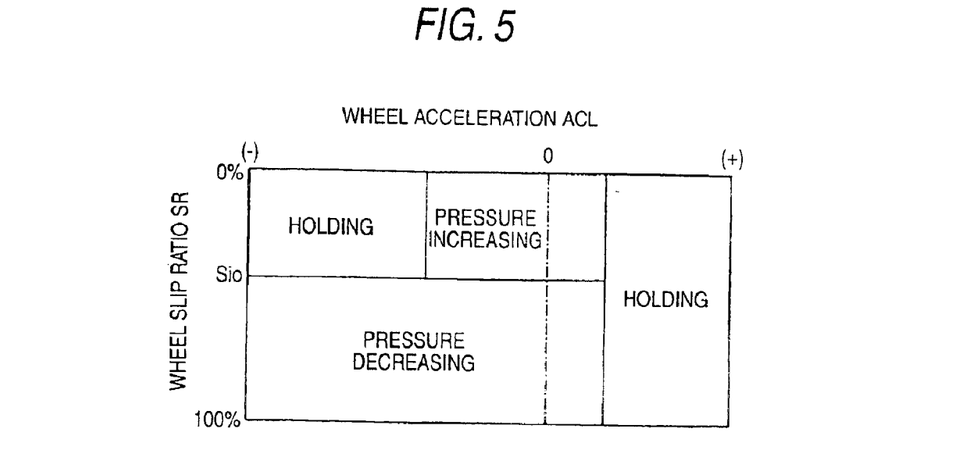
FIG. 5 is a diagram illustrating an example of a map for determining control modes.

FIG. 1 is a schematic view illustrating the construction of an automotive brake system on which an anti-lock control system according to the invention is installed, FIGS. 2A, 2B are sectional views showing a normally-opened electromagnetic valve and a normally-closed electromagnetic valve, FIG. 3 is a flowchart illustrating the contents of an anti-lock controller FIG. 4 is a diagram showing how the normally-opened electromagnetic valve and the normally-closed electromagnetic valve are controlled in control modes, and FIG. 5 is a diagram illustrating one example of a map for determining the control mode.

As shown in FIG. 1, a master cylinder 2 which is an example of a brake fluid pressure generator adapted for generating a brake fluid pressure through the operation of a brake pedal 1 has an output port 4 connecting to wheel cylinders (the wheel brake set forth in the claims) 3a, 3b of left and right front wheels Wf, Wf and an output port 5 connecting to wheel cylinders (not shown) of left and right rear wheels. Note that in FIG. 1, since channels belonging to the output port 5 are identical in construction to the channels belonging to the output port 4, the illustration of the former channels is omitted here.

The output port 4 of the master cylinder 2 and the wheel cylinder 3a of one of the front wheels or the front wheel Wf are connected to each other by a connection line 7, and a normally-opened electromagnetic valve 8 is interposed along the connection line 7. In addition, the wheel cylinder 3a and a reservoir 9 for releasing a brake fluid pressure in the wheel cylinder 3a are connected to each other by a release line 10, and a normally-closed electromagnetic valve 11 is interposed along the release line 10.

While a brake fluid pressure sent from one of the wheel cylinders or the wheel cylinder 3a is reserved in the reservoir 9, this brake fluid pressure is returned to the master cylinder 2 side via a return line 14 along which a pump 12 and a damper chamber 13 for absorbing pump pulsations, which is located upstream of the pump 12, are interposed.

In FIG. 1, reference numeral 15 denotes a check valve provided in parallel with the normally-opened electromagnetic valve 8 for permitting the flow of brake fluid from the wheel cylinder 3a to the master cylinder 2 side, reference numerals 16, 17 denote check valves which are provided in series on upstream and downstream sides of the pump 12, respectively, for permitting the flow of brake fluid from the wheel cylinder 3a to the master cylinder 2 side, and reference numeral 19 denotes wheel speed sensors provided for the left and right front wheels Wf, Wf, respectively, for detecting wheel speeds of the respective wheels Wf Wf.

Note that a relationship between the output port 4 of the master cylinder 2 and the other wheel cylinder 3b is similar to the relationship between the output port 4 of the master cylinder 2 and the wheel cylinder 3a, and here, like reference numerals are imparted to like components, the description thereof being omitted.

Here, to describe the normally-opened electromagnetic valve 8 and the normally-closed electromagnetic valve 11 in detail, as shown in FIG. 2A, in the normally-opened electromagnetic valve 8, an outlet hole 8a is connected to the wheel cylinder 3a, 3b side, and an inlet hole 8b where a throttle in installed is connected to the master cylinder 2 side. A needle 8d is disposed so as to confront a valve seat surface 8c formed between the inlet hole 8b and the outlet hole 8a, and furthermore, an armature 8e is formed at a rear end of the needle 8d, a solenoid 8f being disposed at an outwardly distal portion of the armature 8e. In addition, a return spring 8g is interposed between the needle 8d and the valve seat surface 8c, whereby the needle 8d is biased by this return spring 8g in a direction in which the needle is separated apart from the valve seat surface 8c.

Consequently, in a state where the solenoid 8f is not energized, the needle 8c is separated apart from the valve seat surface 8c by virtue of the elastic force of the return spring 8g, and the inlet hole 8b and the outlet hole 8a are allowed to communicate with each other, whereby the brake fluid pressure from the master cylinder 2 increases the wheel cylinder pressure. In contrast, when the solenoid 8f is energized, the armature 8e is displaced to the solenoid 8f side against the elastic force of the return spring 8g, so that a distal end portion of the needle 8d is brought into abutment with the valve seat surface 8c, whereby the inlet hole 8b and the outlet hole 8a are cut off from each other to thereby hold the wheel cylinder pressure.

On the other hand, as shown in FIG. 2B, in the normally-closed electromagnetic valve 8b, an inlet hole 11a is connected to the wheel cylinder 3a, 3b side and a release hole 11b where a throttle is installed is connected to the reservoir 9 side. A needle 11d is disposed so as to confront a valve seat surface 11c formed between the release hole 11b and the inlet hole 11a, and furthermore, an armature 11e is formed integrally with the needle 11d, a solenoid 11f being disposed at an outwardly distal portion of the armature 11e.

In addition, a return spring 11h is interposed between a spring retainer 11g disposed at an upper portion in FIG. 2B and the needle 11d, whereby the needle 11d is biased by this return spring 11h in a direction in which the needle is brought into contact with the valve seat surface 11c.

Consequently, in a state in which the solenoid 11f is not energized, the needle 11d is in contact with the valve seat surface 11c by the virtue of the elastic force of the return spring 11h, whereby the release hole 11b and the inlet hole 1a are cut off from each other. In contrast, when the solenoid 11f is energized, the armature 11e is displaced to the solenoid 11f side against the elastic force of the return spring 11h, so that a distal end portion of the needle 11d is separated apart from the valve seat surface 11c, whereby the release hole 11b and the inlet hole 11a are allowed to communicate with each other, and the brake fluid is released from the wheel cylinder 3a, 3b so as to decrease the wheel cylinder pressure.

Note that the aforesaid constructions of the respective electromagnetic valves are for the sake of compensation of operations when malfunctions occur or for the sake of a fail safe in which the normally-opened electromagnetic valve 8 stays in the normally-opened condition when not energized and shifts to the closed condition at the changeover point when energized, whereas the normally-closed electromagnetic valve 11 stays in the normally-closed condition when not energized and shifts to the opened condition at the change over point when energized.

In addition, in the normally-opened electromagnetic valve 8, when the brake fluid pressure is applied thereto from the master cylinder 2 side via the connection line 7, the brake fluid pressure so applied acts in the same direction as the biasing direction of the return spring 8g, that is, the direction which leads to the opened condition.

The normally-opened electromagnetic valve 8 and the normally-closed electromagnetic valve 11 which are constructed as is described heretofore and a motor, not shown, for driving the pump 12 are controlled by an anti-lock controller.

Namely, the anti-lock controller determines lockup tendencies of the respective wheels based on wheel speeds of the left and right front wheels and left and right rear wheels detected by the wheel speed sensors 19 and controls the brake fluid pressures at the respective wheel cylinders 3a, 3b to realize any of a pressure decreasing mode where the normally-opened electromagnetic valve 8 is closed, while the normally-closed electromagnetic valve 11 is opened, a holding mode where the normally-opened electromagnetic valve 8 is closed and the normally-closed electromagnetic valve 11 is closed, and a pressure increasing mode where the normally-opened electromagnetic valve 8 is opened, while the normally-closed electromagnetic valve 11 is closed.

The details of the anti-lock controller will be described by reference to a flowchart illustrated in FIG. 3. An operation process executed by the anti-lock controller is executed every predetermined sampling time (for example, 5 microseconds) as a timer interruption process. When an operation process is initiated, firstly, in step S1, an initialization is performed.

Next, the flow proceeds to step S2, where wheel speeds VW of the left and right front wheels Wf, Wf and left and right rear wheels are read by the wheel speed sensors 19 . . . provided for the respective wheels Wf.

Next, the flow proceeds to step S3, a wheel acceleration ACL, an estimated vehicle body speed VRO, and a road surface friction coefficient are calculated, respectively.

The wheel acceleration ACL is obtained by differentiating the wheel speeds VW detected by the wheel speed sensors 19, respectively.

The calculation of the estimated vehicle body speed VRO is performed in accordance with, for example, the conventionally known vehicle body speed operation process. Namely, a maximum value is selected from the wheel speeds VW of the respective wheels Wf as a reference speed, and another operation process is performed further on this reference speed so as to impose a gradient limit on an acceleration side and a deceleration side, respectively. To be specific, a threshold is set for acceleration and deceleration, respectively, for each processing time, and an estimated vehicle body speed is calculated so that changes in vehicle body speed after an estimation can fall within these thresholds or, in other words, in the event that changes in estimated vehicle body speed exceed the predetermined acceleration and deceleration thresholds, an estimated vehicle body speed is calculated by assuming that the acceleration or deceleration thresholds so set are changes in the vehicle body speed during the processing time.

Note that an operation process for calculating this estimated vehicle body speed VRO is disclosed in JP-5-50903 which is proposed by the applicant of this patent application before.

The road surface friction coefficient is not such as to be obtained directly but from the estimated vehicle body speeds VRO obtained from the operations as is described above. Namely, a speed difference $\Delta$VRO between the estimated vehicle body speed VRO (n) that is obtained this time and the estimated vehicle speed VRO (n−1) that is obtained at the previous time is obtained, and an acceleration/deceleration speed value ($\Delta$VRO/$\Delta$T) is obtained by dividing the speed difference $\Delta$VRO so obtained by a time $\Delta$T that has elapsed from the previous sampling timing to the current sampling timing, the resultant value being regarded as a value corresponding to the road surface friction coefficient.

Next, proceeding to step S4, a wheel slip ratio SR is obtained for each wheel Wf. The wheel slip ratio SR can be obtained by subtracting a wheel speed of the wheel Wf for which a wheel slip ratio is attempted to be obtained from the estimated vehicle body speed VRO, and then dividing the resultant value by the estimated vehicle body speed VRO.

Namely, when expressed by an equation, the following will result;

$$SR=[(VRO-VW)/VRO]\times 100$$

Next, the flow proceeds to step S5, where an anti-lock control mode determination is made on the left and right front wheels Wf, Wf and the left and right rear wheels which are controlled together, respectively. As also shown in FIG. 4, the anti-lock control modes include a pressure increasing mode, a holding mode, a pressure decreasing mode, and a stop mode where no anti-lock control is performed. Furthermore, the pressure increasing mode is divided into a simple pressure increasing mode and a duty pressure increasing mode where a command signal imparted to the normally-opened electromagnetic valve 8 is duty ratio controlled through the PWM control. In addition, the holding mode is also divided into a simple holding mode and a duty holding mode where a command signal imparted to the normally-opened electromagnetic valve 8 is duty ratio controlled through a PWM (Pulse Width Modulation) control.

This anti-lock control mode determines, for example, the pressure increasing mode, the holding mode, or the pressure decreasing mode, as shown in FIG. 5, based on the wheel slip ratio SR obtained as is described earlier and the wheel acceleration ACL of each wheel Wf. A plurality of maps like this are prepared according to the acceleration/deceleration values ($\Delta$VRO/$\Delta$T) obtained for the respective road surface friction coefficients.

For example, in a map example shown in FIG. 5, when the wheel acceleration is larger than a threshold $\beta$ on a positive side, the holding mode is set no matter which value the wheel slip ratio SR takes. In addition, when the wheel acceleration resides between the threshold $\beta$ on the positive side and a threshold $\alpha$ on a negative side, the pressure increasing mode is set with the wheel slip ratio SR being smaller than a set value Si0, while the pressure decreasing mode is set with the wheel slip ratio SR being equal to or larger than the set value Si0. Furthermore, when the wheel acceleration is smaller than the threshold a on the negative side, the holding mode is set with the wheel slip ratio SR being smaller than the set value Si0, while the pressure decreasing mode is set with the wheel slip ratio SR being equal to or larger than the set value Si0.

In the holding mode, a changeover between the simple holding mode and the duty holding mode is set such that the duty holding mode is set in a state where a predetermined condition is established, whereas the simple holding mode is set in a state where the predetermined condition is not established.

Here, as the predetermined condition, for example, a condition can be considered where the voltage of a power supply for the vehicle is equal to or higher than a set value that is determined in advance or the terminal voltage connecting to the normally-opened electromagnetic valve 8 is equal to or higher than a set value that is determined in advance, or a condition can also be considered where a brake fluid pressure that is being generated in the master cylinder 2 is equal to or lower than a set pressure that is determined in advance. In short, conditions can be referred to as the predetermined condition which can bring the normally-opened electromagnetic valve 8 into a sufficient closed condition and which can hold the closed condition so realized even in a condition where a current value is of a predetermined ratio which is equal to or smaller than the rated current.

In addition, when the anti-lock controller is set to the holding mode, the current value applied to the normally-opened electromagnetic valve 8 is set so as to become smaller than a current value which is applied to the normally-opened electromagnetic valve 8 in the pressure decreasing mode.

To be specific, the duty ratio of a command signal applied to the normally-opened electromagnetic valve 8 in the duty holding mode is set to about 65 to 75 percent of the command signal applied to the normally-opened electromagnetic valve 8 in the pressure decreasing mode, assuming that the command signal is then applied to the same electromagnetic valve in its full extent or 100 percent.

In the pressure increasing mode, a determination is made as to whether or not the calculated road surface friction coefficient is equal to or larger than a predetermined value, and if it is determined to be equal to or larger than the predetermined value, the simple pressure increasing mode is selected, whereas if the calculated road surface friction coefficient is less than the predetermined value, the duty pressure increasing mode is selected.

After the determination of the anti-lock control mode is completed, the flow proceeds to step S6, where command signals are delivered to control the normally-opened electromagnetic valve 8 and the normally-closed electromagnetic valve 11 which are provided for each wheel Wf and the motor for driving the pump 12 for controlling the operations of the respective devices.

Next, the function of the automotive anti-lock control system constructed as is described heretofore will be described below.

When the driver depresses the brake pedal 1, a brake fluid pressure generated by the master cylinder 2 is outputted from the output ports 4, 5. At the normal time when no anti-lock control is performed, since the normally-opened electromagnetic valve 8 of the anti-lock control system is in the opened condition and the normally-closed electromagnetic valve 11 there is in the closed condition, the brake fluid pressure from the master cylinder 2 is transmitted to the wheel cylinders 3a, 3b as it is to thereby apply brakes on the wheels Wf, Wf.

Then, when the wheels Wf are about to lock up due to, for example, the strong depression of the brake pedal 1, whereupon the wheel speeds VW becomes lower than an actual vehicle body speed (in reality, the wheel speeds are compared with the estimated vehicle body speed VRO) and the wheel slip ratios SR increase, the normally-opened electromagnetic valves 8 are put in the closed condition and the normally-closed electromagnetic valves 11 are put in the opened condition by command signals from the anti-lock controller, whereby since the brake fluid pressure from the master cylinder 2 is cut off by the normally-opened electromagnetic valves 8 which are being closed and is not transmitted to the wheel cylinders 3a, 3b, and the brake fluid at the wheel cylinders 3a, 3b is discharged to the reservoir 9 via the normally-closed electromagnetic valves 11 which are being opened, the brake fluid pressures at the wheel cylinders are decreased. As this occurs, the brake fluid discharged to the reservoir 9 is returned to the master cylinder 2 side by virtue of the action of the pump 12.

When the brake fluid pressures at the wheel cylinders 3a, 3b are decreased to thereby eliminate the lockup tendency, the energization to the normally-closed electromagnetic valves 8 is stopped to cut off the communication between the wheel cylinders 3a, 3b and the reservoir 9 so as to hold the brake fluid pressures at the wheel cylinders 3a, 3b. As a result, the braking force of the wheel cylinders 3a, 31b is held constant, and the wheel speeds VW which are decreasing are then caused to restore. Then, when the wheel speeds VW approach the actual vehicle body speed, the brake fluid pressures at the wheel cylinders 3a, 3b are increased by opening the normally-opened electromagnetic valves 8 to a predetermined opening. Thus, by repeating the cycle including the pressure decreasing mode (including the holding mode) and the pressure increasing mode, a maximum brake force can be generated while preventing the lockup of the wheels.

Figure 6A:
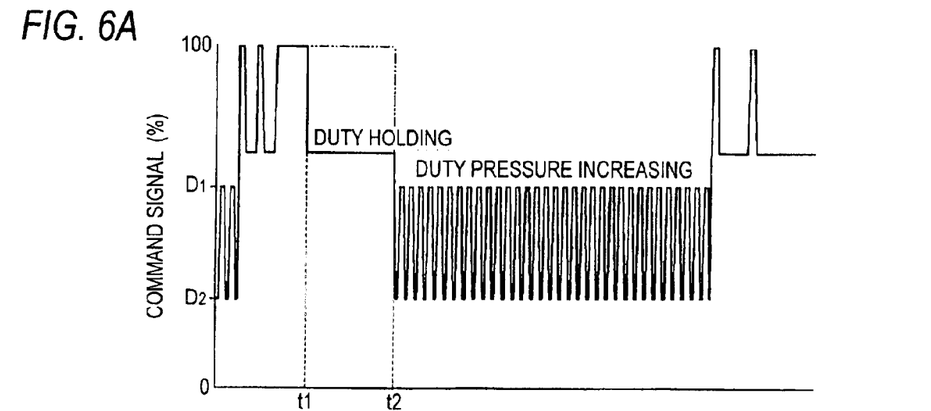
FIGS. 6A to 6C are timing charts illustrating changes in actual vehicle body speed, wheel acceleration and wheel pressure when an anti-lock control is implemented.
Figure 6B:
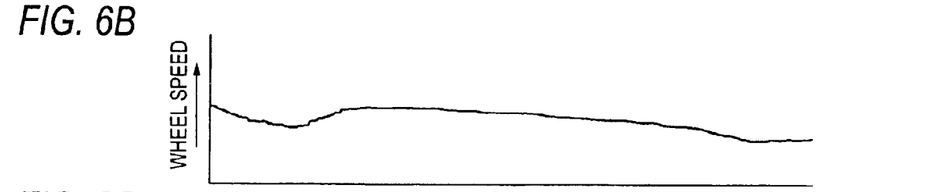
Figure 6C:
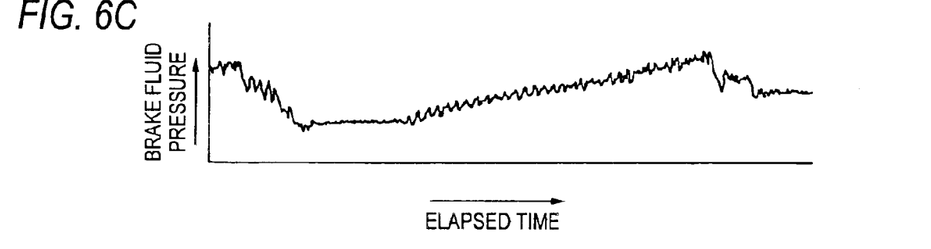

FIGS. 6A–6C are timing charts illustrating changes in the actual vehicle body speed, wheel speed VW and brake fluid pressure of the wheel cylinder (hereinafter, also simply referred to as a wheel cylinder pressure from time to time).

Here, in the holding mode, when the predetermined condition, that is, the condition where the voltage of the power supply for the vehicle is equal to or larger than the set value that is determined in advance or where the terminal voltage connected to the normally-opened electromagnetic valve 8 is equal to or larger than the set value which is determined in advance is satisfied, the current value applied to the normally-opened electromagnetic valve 8 is controlled such that the duty ratio becomes about 70 percent through the PWM control. In other words, the anti-lock control member controls, in the state where the predetermined condition is established, such that the current value applied to the normally-opened electromagnetic valve 8 in the holding mode becomes smaller than the current value applied to the normally-opened electromagnetic valve 8 in the pressure decreasing mode (times t1 to t2).

As this occurs, as is clear from FIGS. 6A–6C, it is seen that while they oscillate slightly vertically, the brake fluid pressures of the wheel cylinders 3a, 3b (the wheel cylinder pressures) are maintained substantially constant. This represents that the normally-opened electromagnetic valves 8 are held in the closed condition. Thus, in order to bring them into the closed condition, since the normally-opened electromagnetic valve 8 is closed by conducting the current value of a duty ratio of in the order of 70 percent, not by conducting a current value of a duty ratio of 100 percent, consumed current can be saved when compared with a case where the current value of the duty ratio of 100 percent is conducted.

In addition, when changing over the control modes to the pressure increasing mode (at least the mode which requires the normally-opened electromagnetic valve to be changed over from the closed condition to the opened condition) which tends to be implemented following the holding mode, the response can be improved by such an extent that the normally-opened electromagnetic valve 8 is not closed with an excessive magnetic force which is larger than required.

Note that while the current value of the duty ratio of 100 percent is conducted to the normally-opened electromagnetic valve 8 when the pressure decreasing mode is implemented following the holding mode, since the normally-opened electromagnetic valve 8 is already in the closed condition, there is no case where the response to the pressure decreasing command is delayed.

In contrast, in the duty pressure increasing mode, predetermined values $D_1$, $D_2$ which put the current value to be applied to the normally-opened electromagnetic valve 8 in a relationship such as $100 > D_1 > D_2 > 0$ when assuming that in the pressure decreasing mode, the current value resulting when the normally-opened electromagnetic valve 8 is continuously energized (ON) is 100, while the current value resulting when the energization is stopped (OFF) is 0 are repeated at predetermined time intervals, whereby even if the brake fluid pressure on the master cylinder 2 side fluctuates, it is made difficult for the normally-opened electromagnetic valve to be subjected to effects imposed by such fluctuations, and this allows the amount of brake fluid which flows into the wheel cylinders 3a, 3b to be controlled more accurately, thereby making it possible to stabilize the pressure increasing rate in the duty pressure increasing mode.

Incidentally, while a continuous application of a current value of an intermediate duty ratio between 0 to 100 percent to the normally-opened electromagnetic valve 8 to set the opening thereof to a predetermined value can be considered as a method for gradually increasing the wheel cylinder pressure in the pressure increasing mode, in this case, the non-linear change in thrust relative to stroke is raised as one of the characteristics of the normally-opened electromagnetic valve 8, and with the electromagnetic valve having such a characteristic, even if a constant current value of the intermediate duty ratio is applied, the normally opened electromagnetic valve is easy to be subjected to the effects of the fluctuation in the brake fluid pressure on the master cylinder 2 side, resulting in unstable opening, and hence, there is caused a concern that the pressure increasing rate in the pressure increasing mode cannot be stabilized.

While the embodiment of the invention is described in detail heretofore, the invention is not limited to the embodiment but can be modified in various ways with respect to its design without departing from the sprit and scope the invention which is defined by what is claimed by the claims.

For example, the invention can be applied to motorcycles and tricycles, in addition to four-wheeled vehicles.

In addition, while in the embodiment, the condition where the voltage of the power supply for the vehicle or the terminal voltage of the normally-opened electromagnetic valve is equal to or larger than the set value which is determined in advance or the condition where the brake fluid pressure which is being generated in the master cylinder 2 is equal to or lower than the set pressure which is determined in advance is raised as the condition for adopting the duty holding mode, a condition resulting by cross-linking any two of the three conditions using an AND condition may be adopted as the predetermined condition, and furthermore, a condition resulting by cross-linking those three conditions using the AND condition may also be adopted as the predetermined condition.

As is described in detail heretofore, according to the automotive anti-lock control system of the invention, since the current value that is applied to the normally-opened electromagnetic valve in the holding mode is controlled to become smaller than the current value that is applied to the normally-opened electromagnetic valve in the pressure decreasing mode in the state where the predetermined condition is established, when compared with a case where a current value which is identical to that applied to the normally-opened electromagnetic valve in the pressure decreasing mode is applied to the normally-opened electromagnetic valve in the holding mode, consumed current can be decreased and the response to the changeover from the holding mode to the pressure increasing mode can be improved.

What is claimed is:

1. An automotive anti-lock control system comprising:
   a brake fluid pressure generator;
   a wheel brake;
   a connection line for connecting the brake fluid pressure generator and the wheel brake;
   a release line for connecting a reservoir for reserving brake fluid and the wheel brake;
   a normally-opened electromagnetic valve interposed along the connection line;

a normally-closed electromagnetic valve interposed along the release line;

a wheel speed sensor for detecting the wheel speed of a wheel; and anti-lock controller which determines a lockup tendency of the wheel based on the wheel speed detected by the wheel speed sensor and controls the brake fluid pressure of the wheel brake to a pressure decreasing mode where the normally-opened electromagnetic valve is closed and the normally-closed electromagnetic valve is opened, a holding mode where the normally-opened electromagnetic valve is closed and the normally-closed electromagnetic valve is closed, and a pressure increasing mode where the normally-opened electromagnetic valve is opened and the normally-closed electromagnetic valve is closed, wherein the anti-lock controller controls such that a current value applied to the normally-opened electromagnetic valve in the holding mode becomes smaller than a current value applied to the normally-opened electromagnetic valve in the pressure decreasing mode in a state in which a predetermined condition is established.

2. The automotive anti-lock control system as set forth in claim 1, wherein the predetermined condition is such that the voltage of a power supply for a vehicle or the terminal voltage of the normally-opened electromagnetic valve is equal to or larger than a set value which is determined in advance.

3. The automotive anti-lock control system as set forth in claim 1, wherein the predetermined condition is such that a brake fluid pressure which is being generated in the brake fluid generator is equal to or lower than a set pressure which is determined in advance.

* * * * *